US008896584B2

(12) United States Patent
Liu

(10) Patent No.: US 8,896,584 B2
(45) Date of Patent: Nov. 25, 2014

(54) SCAN METHOD FOR DISPLAYING IMAGE

(75) Inventor: Shang-I Liu, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 366 days.

(21) Appl. No.: 13/482,970

(22) Filed: May 29, 2012

(65) Prior Publication Data

US 2013/0016076 A1 Jan. 17, 2013

(30) Foreign Application Priority Data

Jul. 14, 2011 (TW) ............................ 100124944 A

(51) Int. Cl.
*G06F 3/038* (2013.01)
*G09G 3/36* (2006.01)

(52) U.S. Cl.
CPC ...... *G09G 3/3648* (2013.01); *G09G 2310/0213* (2013.01)
USPC .............................. 345/209; 345/96; 345/214

(58) Field of Classification Search
CPC . G06G 3/3275; G06G 3/3614; G06G 3/3685; G06F 3/038
USPC .................................... 345/96, 204, 209, 214
See application file for complete search history.

(56) References Cited

U.S. PATENT DOCUMENTS

| | | | | |
|---|---|---|---|---|
| 7,932,884 | B2 * | 4/2011 | Song et al. | 345/96 |
| 2009/0179875 | A1 * | 7/2009 | Li et al. | 345/204 |
| 2009/0289928 | A1 * | 11/2009 | Shi | 345/209 |

FOREIGN PATENT DOCUMENTS

| | | |
|---|---|---|
| CN | 101266745 | 9/2008 |
| CN | 101271658 | 9/2008 |
| CN | 101739972 | 6/2010 |
| TW | 200723232 | 6/2007 |
| TW | 200837706 | 9/2008 |
| TW | 200943251 | 10/2009 |

OTHER PUBLICATIONS

"Office Action of Taiwan Counterpart Application", issued on Apr. 16, 2014, p. 1-p. 10.

"Office Action of China Counterpart Application", issued on Apr. 3, 2014, p. 1-p. 90.

* cited by examiner

*Primary Examiner* — Andrew Sasinowski
(74) *Attorney, Agent, or Firm* — Jianq Chyun IP Office

(57) ABSTRACT

A scan method for displaying image, wherein a display panel has N gate lines to display an image, and N≥4. The image is displayed by dot inversion or line inversion. The method includes displaying a first image frame by a first scan sequence. The first frame has multiple first scan-line groups in relative darkness and multiple second scan-line groups in relative brightness, which are alternately displayed. Just after the second frame, a second scan sequence displays a second frame. The second frame has multiple first scan-line groups in relative darkness and multiple second scan-line groups in relative brightness, which are alternately displayed. The first and second scan-line groups of the first frame are complementary to the first and second scan-line groups of the second frame. The first scan-line groups of the first frame and second frame are relatively dark due to the pixels therein with insufficient charge.

17 Claims, 13 Drawing Sheets

SCAN METHOD FOR DISPLAYING IMAGE

CROSS-REFERENCE TO RELATED APPLICATION

This application claims the priority benefit of Taiwan application serial no. 100124944, filed on Jul. 14, 2011. The entirety of the above-mentioned patent application is hereby incorporated by reference herein and made a part of this specification.

BACKGROUND OF THE DISCLOSURE

1. Technical Field

The invention is related generally to a scan method for displaying image, and more particularly to a method capable of compensating poor display from a multiple line scan.

2. Background

A driving circuit of a panel may be categorized into a dot inversion or a line inversion driving circuit by the output method of the source and the VCOM. Under the dot inversion and line inversion driving method, two adjacent gate lines output data of different polarity to compensate a flickering problem caused by an offset of positive and negative polarity output. However, a disadvantage comes from the power consumption added by two adjacent gate lines outputting data of different polarity.

An N-line scan method is therefore proposed, in which the scan sequence in the N-line scan is G1→G3→G2→G4 . . . , where G1, G2, . . . GN are the order numbers of the gate lines. Since G1 and G3 have the same polarity, and G2 and G4 have the same polarity, even though the panel may still be arranged in an one-dot or one-line inversion configuration, in terms of power consumption, the panel consumes power as in a two-dot or two-line inversion configuration. Further power savings can be achieved in the scan method by optimizing the gate scan sequence. For example, a conventional method is by scanning G1→G3→G5→ . . . →GN-1→G2→G4→ . . . GN. However, this method results in a display of poor visual quality.

Therefore, how to enhance the display effect is a matter of research and development.

SUMMARY OF THE INVENTION

The invention provides a scan method for displaying image capable of compensating a problem of uneven brightness while scanning to display the image.

The invention provides a scan method for displaying image, in which a display panel has N gate lines to display an image, N≥4, and the image is displayed by dot inversion or line inversion. The scan method includes displaying a first image frame by a first scan sequence, in which the first image frame has a plurality of first gate-line groups in relative darkness and a plurality of second gate-line groups in relative brightness, and the first gate-line groups and the second gate-line groups are alternately displayed. Just after the first image frame, a second image frame is displayed by a second scan sequence, wherein the second image frame has a plurality of first gate-line groups in relative darkness and a plurality of second gate-line groups in relative brightness, and the first gate-line groups and the second gate-line groups are alternately displayed, in which the first and second gate-line groups of the first image frame are complementary to the first and second gate-line groups of the second image frame. Moreover, the first gate-line groups of the first image frame and the second image frame are relatively dark due to a plurality of pixels therein with insufficient charge.

The invention provides another scan method for displaying image, in which a display panel has N gate lines to display an image, N≥4, and the image is displayed by dot inversion or line inversion. The method includes displaying a first image frame group by a first scan sequence, the first image frame group having a plurality of first image frames, each of the first image frames having a plurality of first gate-line groups in relative darkness and a plurality of second gate-line groups in relative brightness, and the first gate-line groups and the second gate-line groups are alternately displayed. Just after the first image frame group, a second image frame group is displayed by a second scan sequence, the second image frame group having a plurality of second image frames, each of the second image frames having a plurality of third gate-line groups in relative darkness and a plurality of fourth gate-line groups in relative brightness, and the third gate-line groups and the fourth gate-line groups are alternately displayed. The first and second gate-line groups of the first image frames are complementary to the third and fourth gate-line groups of the second image frames. A quantity of the second image frames of the second image frame group is equal to a quantity of the first image frames of the first image frame group. The first scan sequence and the second scan sequence are cycled. Moreover, the first gate-line groups and the third gate-line groups of the first image frames and the second image frames are relatively dark due to a plurality of pixels therein with insufficient charge.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The invention first explores the problems generated when a conventional scan method for displaying image is adopted.

Figure 1:
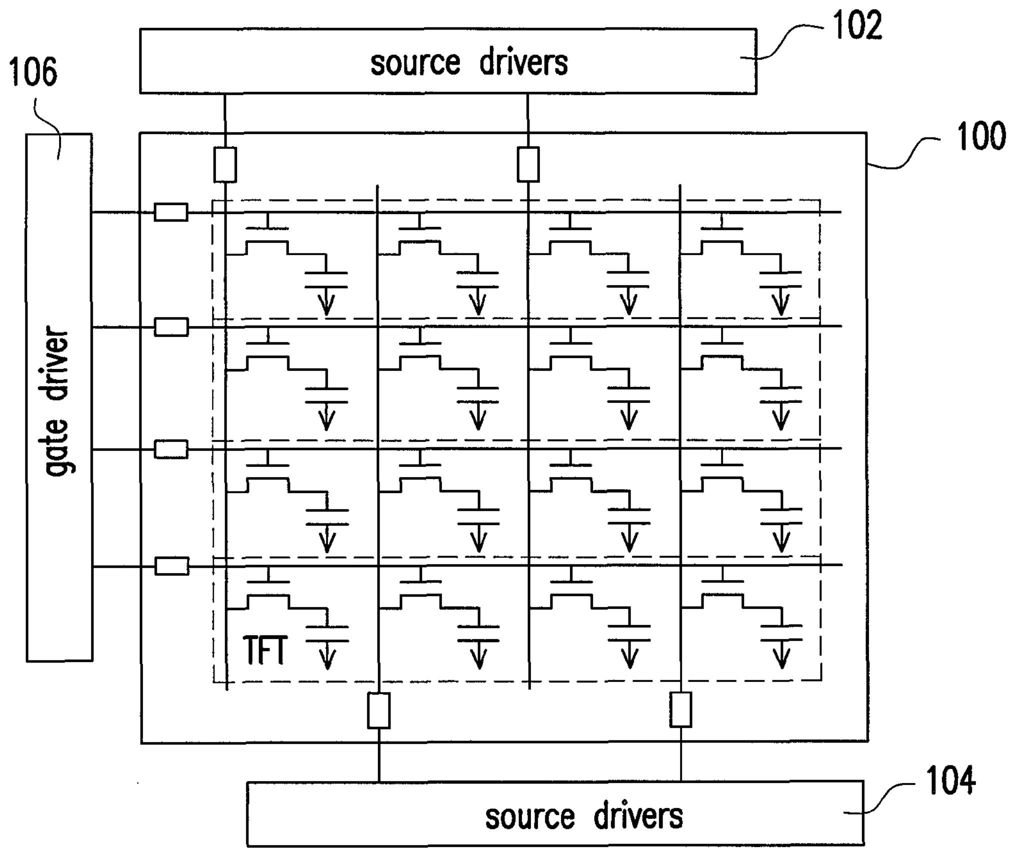
FIG. 1 is a structural schematic view of a conventional display panel.
Figure 2:
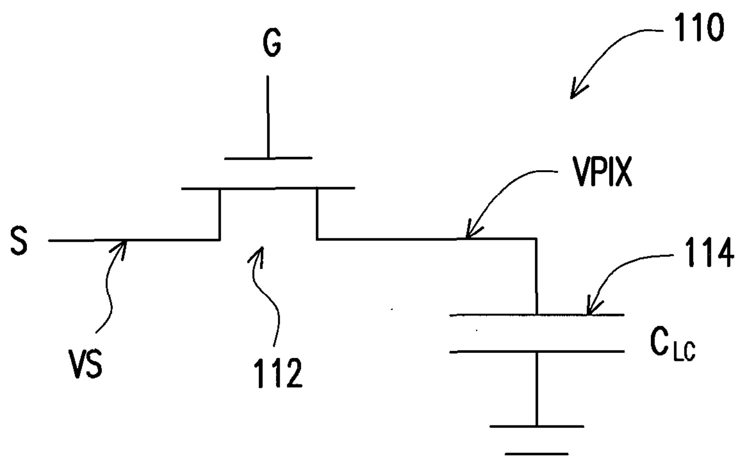
FIG. 2 illustrates a pixel circuit.

FIG. 1 is a structural schematic view of a conventional display panel. Referring to FIG. 1, a display panel 100 may be a thin film transistor liquid crystal display (TFT-LCD) having a pixel array. In FIG. 1, the pixel array is illustrated as a 4×4 pixel array for description purposes. Each of the pixels corresponds to a color, and the pixel displays a predetermined color gray level. Three adjacent colors form a color dot. FIG. 2 illustrates a pixel circuit. Referring to FIG. 2, a circuit of a pixel 110 includes a TFT 112 and a liquid crystal capacitor 114. The TFT 112 has a gate G connecting to a gate driver 106. The TFT 112 has a source S connecting to the source drivers 102 and 104. Moreover, the TFT 112 has a drain connecting to the liquid crystal capacitor 114, and a transmissivity of the liquid crystal is driven in accordance with a pixel data.

According to the pixel data, the pixel gray level values of the corresponding colors are inputted from the source drivers 102 and 104. According to the size of the display panel 100 and the driving ability of a single source driver, a plurality of source drivers may be used. For example, source drivers 102 and 104 respectively drive a portion of the pixels. The gate driver 106 controls whether the TFT 112 turns on and off to input the pixel data. In other words, the horizontal display lines are also called gate lines due to the function thereof.

Figure 3:
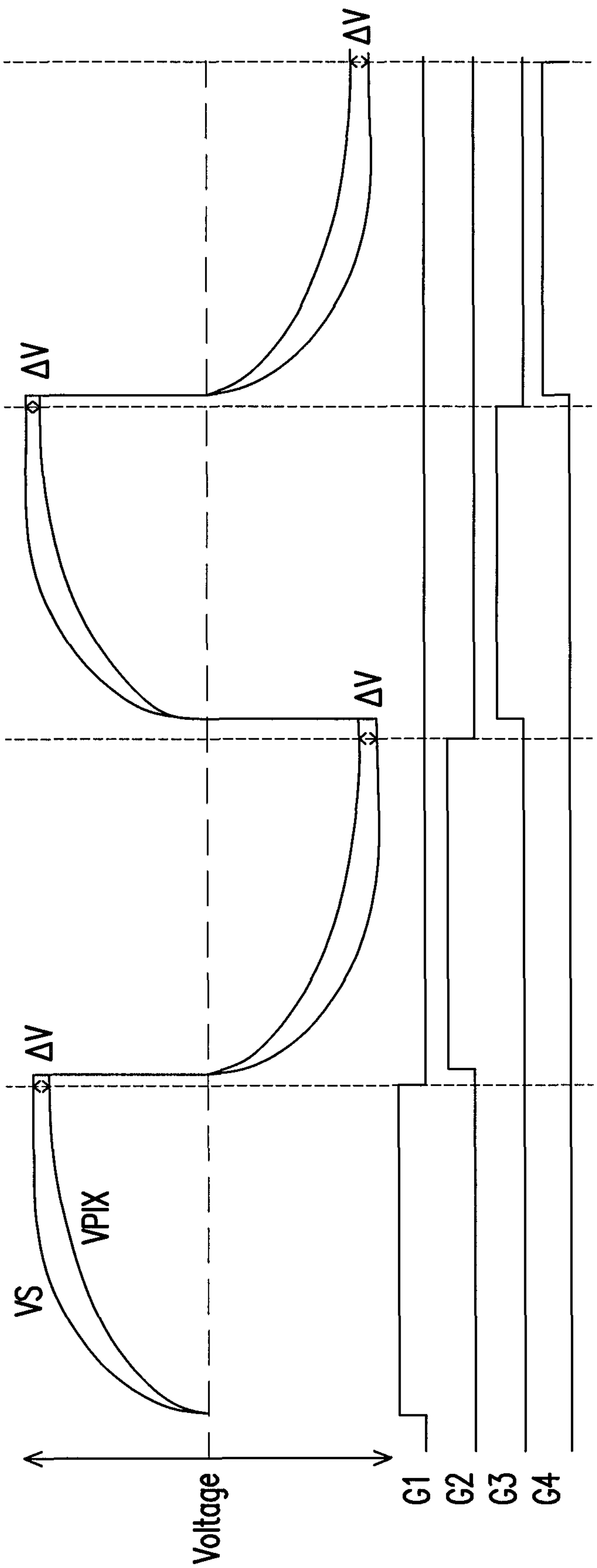
FIG. 3 is a schematic graph illustrating a correlation between a liquid crystal swing voltage and an input voltage according to an embodiment of the invention.

FIG. 3 is a schematic graph illustrating a correlation between a liquid crystal swing voltage and an input voltage according to an embodiment of the invention. Referring to FIG. 3, due to the fabrication of the TFT 112 and the correlation between the input voltage VS of the source drivers 102 and 104 and the liquid crystal swing voltage VPIX, the gate of the metal oxide semiconductor (MOS) structure of the TFT 112 causes an issue of a large turn-on impedance. Therefore, since the charge time is only for a single scan line, the voltage VPIX stored finally at the swing voltage point may be slightly less than the input voltage VS. When multiple line scan (N-line scan) is not used, the gate lines (i.e., the scan lines) G1, G2, G3, G4, . . . GN are scanned sequentially. Since the gate lines all encounter the same insufficient charge condition, no noticeable display problem occurs for the entire image.

Figure 4:
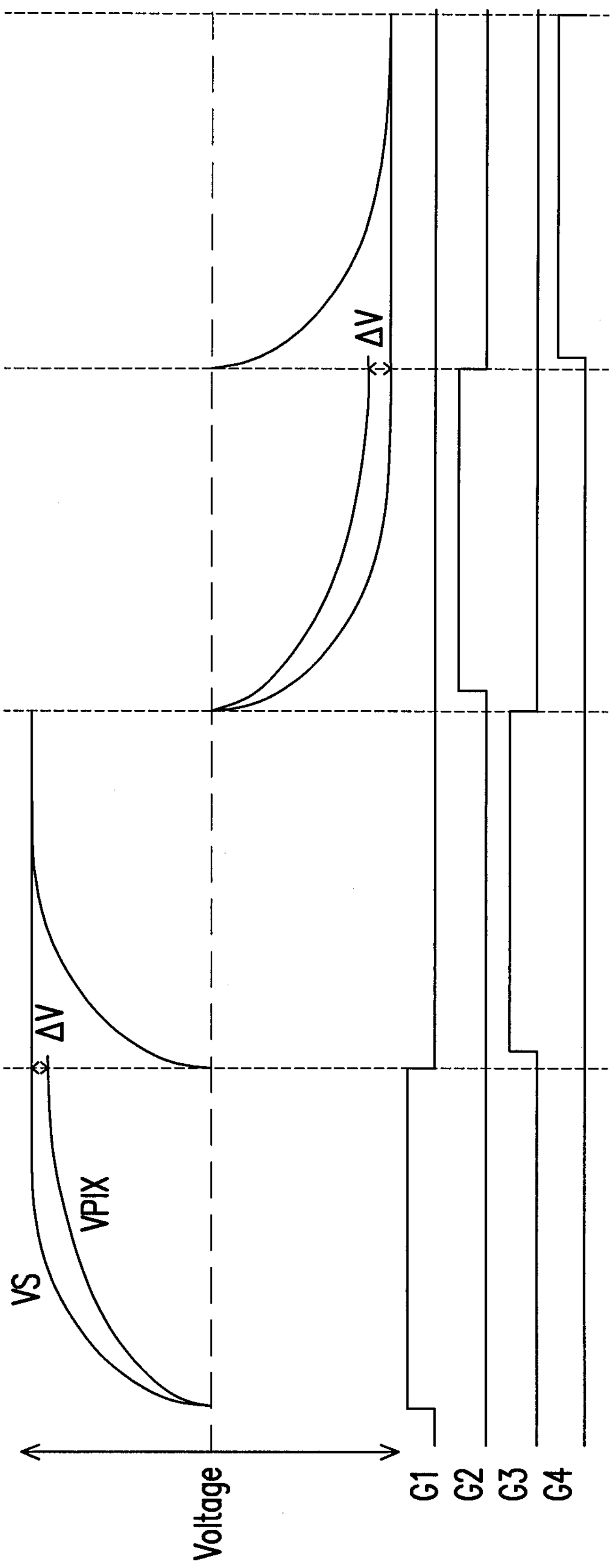
FIG. 4 is a schematic graph illustrating a correlation between a liquid crystal swing voltage and an input voltage under a two-line scan according to an embodiment of the invention.

FIG. 4 is a schematic graph illustrating a correlation between a liquid crystal swing voltage and an input voltage under a two-line scan according to an embodiment of the invention. Referring to FIG. 4, when a 2-line scan driving method is used, a scan sequence for four adjacent gate lines may be G1→G3→G2→G4. Since there is no charge time for the input voltage VS on the gate lines G3 and G4, the voltage VPIX is closer to the final voltage level of the input voltage VS, and accordingly the final voltage levels of the gate lines G1 and G2 are different from those of the gate lines G3 and G4, thereby causing horizontal streaks in the display.

Figure 5:
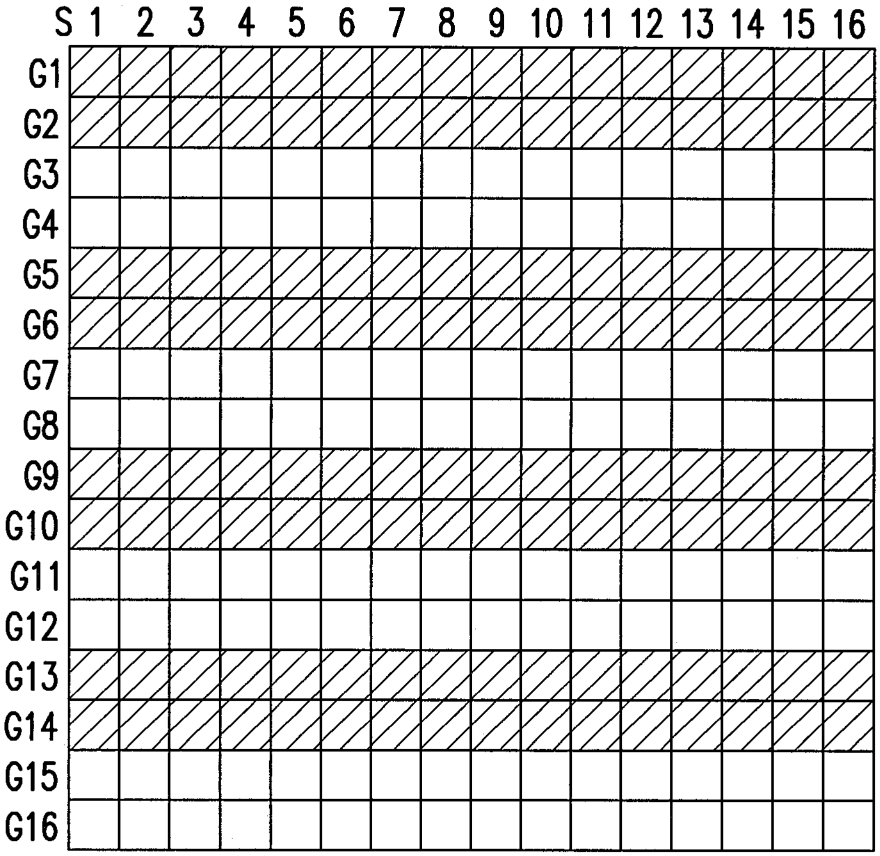
FIG. 5 is a schematic view of a display quality problem for a N-line scan.

FIG. 5 is a schematic view of a display quality problem for a N-line scan. Referring to FIG. 5, a 16×16 display array is used as an example, in which G1-G16 represent the order numbers of the gate lines. S1-S16 represent the order numbers of the source lines. Since a gate-line group of the gate lines G1 and G2 is insufficiently charged, the gate-line group is relatively dark. Moreover, because a gate-line group of the gate lines G3 and G4 has a longer charge time and is closer to the input voltage VS, the gate-line group is relatively bright. The relative bright and dark phenomenon repeats in each of four consecutive gate lines.

In view of the problems discussed above, embodiments of the invention provide a compensation mechanism capable of at least alleviating the problem of horizontal streaks described earlier. Embodiments are described hereinafter to clarify the invention. However, the invention is not limited to the embodiments described herein.

Figure 6:
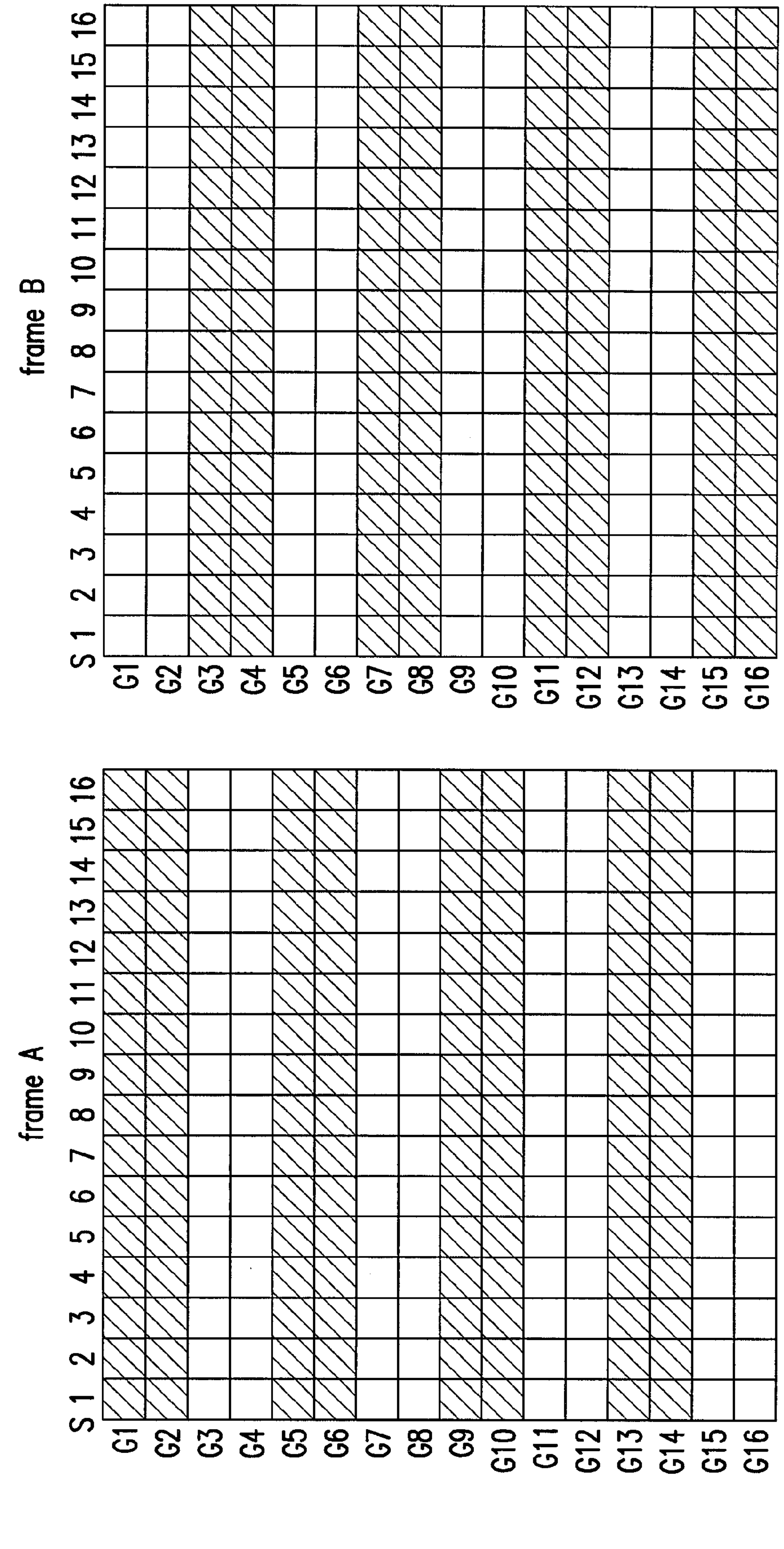
FIG. 6 is a schematic view illustrating a dark line compensation effect generated by a scan method for displaying image according to an embodiment of the invention.
Figure 7:
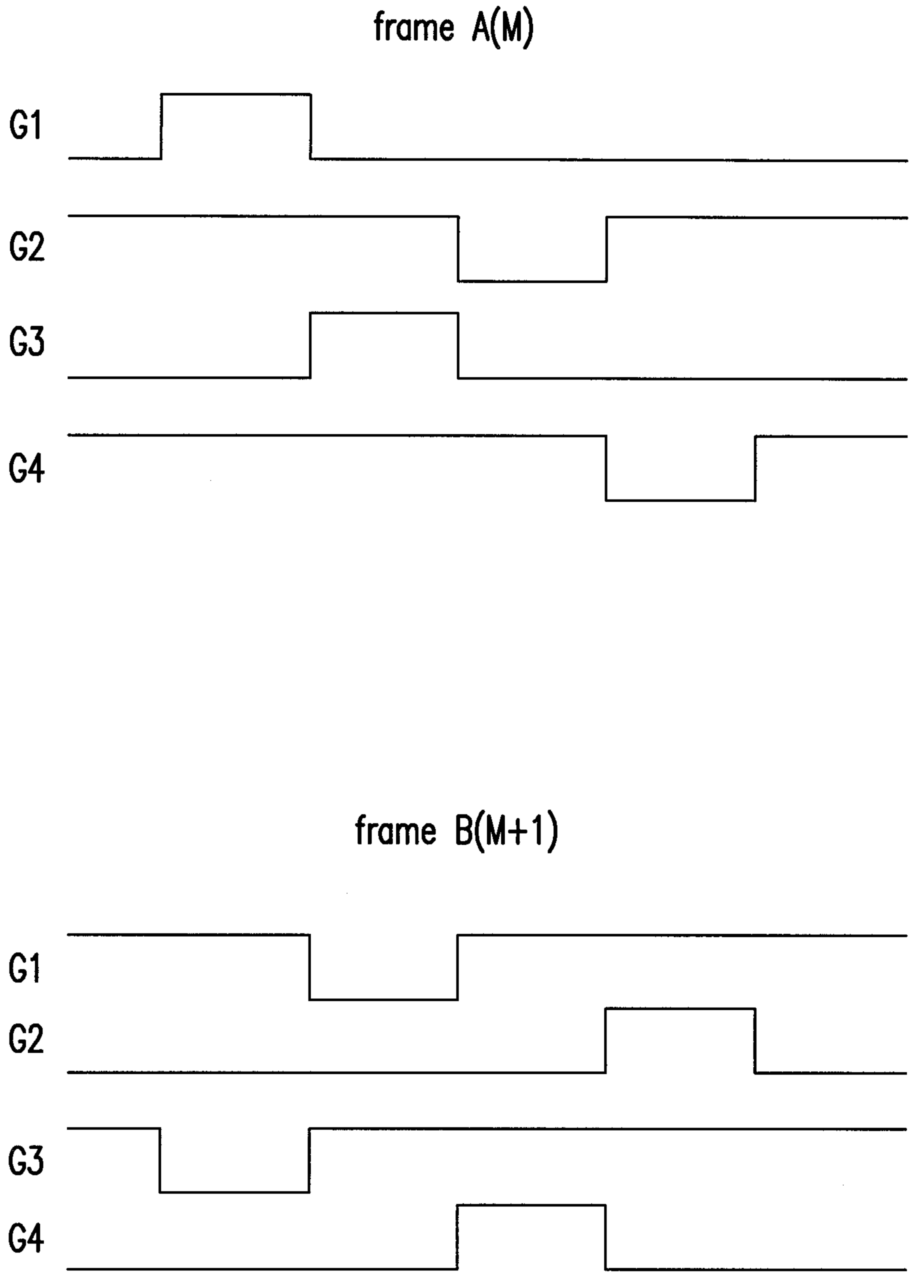
FIG. 7 is a schematic view illustrating a scan sequence mechanism of a scan method for displaying image according to an embodiment of the invention.

FIG. 6 is a schematic view illustrating a dark line compensation effect generated by a scan method for displaying image according to an embodiment of the invention. FIG. 7 is a schematic view illustrating a scan sequence mechanism of a scan method for displaying image according to an embodiment of the invention. Referring to FIGS. 6 and 7, two adjacent image frames M and M+1 are represented by image frames A and B. By adopting the two gate line scan sequences depicted in FIG. 7, the bright and dark line compensation effect depicted in image frames A and B can be achieved. After image frames A and B are displayed, a visual balance between brightness and darkness can be achieved.

Further description of FIG. 7 and the signals on the gate lines illustrated below is provided hereafter. Moreover, the pixel polarities of the signals are also depicted. After a upward pulse representing a gate turn-on, a voltage of positive polarity is inputted to a coupled pixel. After a downward pulse which represents a gate turn-on, a voltage of negative polarity is inputted to the coupled pixel. Using a recurring unit of four consecutive gate lines G1, G2, G3, and G4 as an example for description, a display sequence of the image frame A is G1→G3→G2→G4 . . . . Since the gate lines G1 and G3 are positive polarity, a positive voltage charging the gate line G3 is relatively higher and brighter. Similarly, since the gate lines G2 and G4 are negative polarity, a negative voltage charging the gate line G4 is relatively higher and brighter. Moreover, the image of the entire image frame still maintains the one-dot or one-line inversion characteristic.

The display sequence of the image frame B is G3→G1→G4→G2 . . . . Since the gate lines G1 and G3 are negative polarity, the gate line G1 is turned on after the gate line G3 is turned on, and the negative voltage for the charging operation thereof is relatively higher and brighter. Similarly, since the gate lines G2 and G4 are positive polarity, the gate line G2 is turned on after the gate line G4 is turned on, and the positive voltage for the charging operation thereof is relatively higher and brighter. Moreover, the image of the entire image frame still maintains the one-dot or one-line inversion characteristic.

Table 1 is a scan sequence corresponding to the image frame A of FIG. 6, in which four consecutive scan lines G1, G2, G3, and G4 are a recurring unit with a scan sequence of G1→G3→G2→G4.

TABLE 1

| Image Frame | A | | | | | | | | | | | | | | | |
|---|---|---|---|---|---|---|---|---|---|---|---|---|---|---|---|---|
| Gate Line | 1 | 3 | 2 | 4 | 5 | 7 | 6 | 8 | 9 | 11 | 10 | 12 | 13 | 15 | 14 | 16 |
| Polarity | + | + | − | − | + | + | − | − | + | + | − | − | + | + | − | − |
| Polarity Change | y | | y | | y | | y | | y | | y | | y | | y | |

Table 2 is a scan sequence corresponding to the image frame B of FIG. 6, in which four consecutive scan lines G1, G2, G3, and G4 are a recurring unit with a scan sequence of G3→G1→G4→G2.

TABLE 2

| Image Frame | B | | | | | | | | | | | | | | | |
|---|---|---|---|---|---|---|---|---|---|---|---|---|---|---|---|---|
| Gate Line | 3 | 1 | 4 | 2 | 7 | 5 | 8 | 6 | 11 | 9 | 12 | 10 | 15 | 13 | 16 | 14 |
| Polarity | − | − | + | + | − | − | + | + | − | − | + | + | − | − | + | + |
| Polarity Change | y | | y | | y | | y | | y | | y | | y | | y | |

Figure 8:
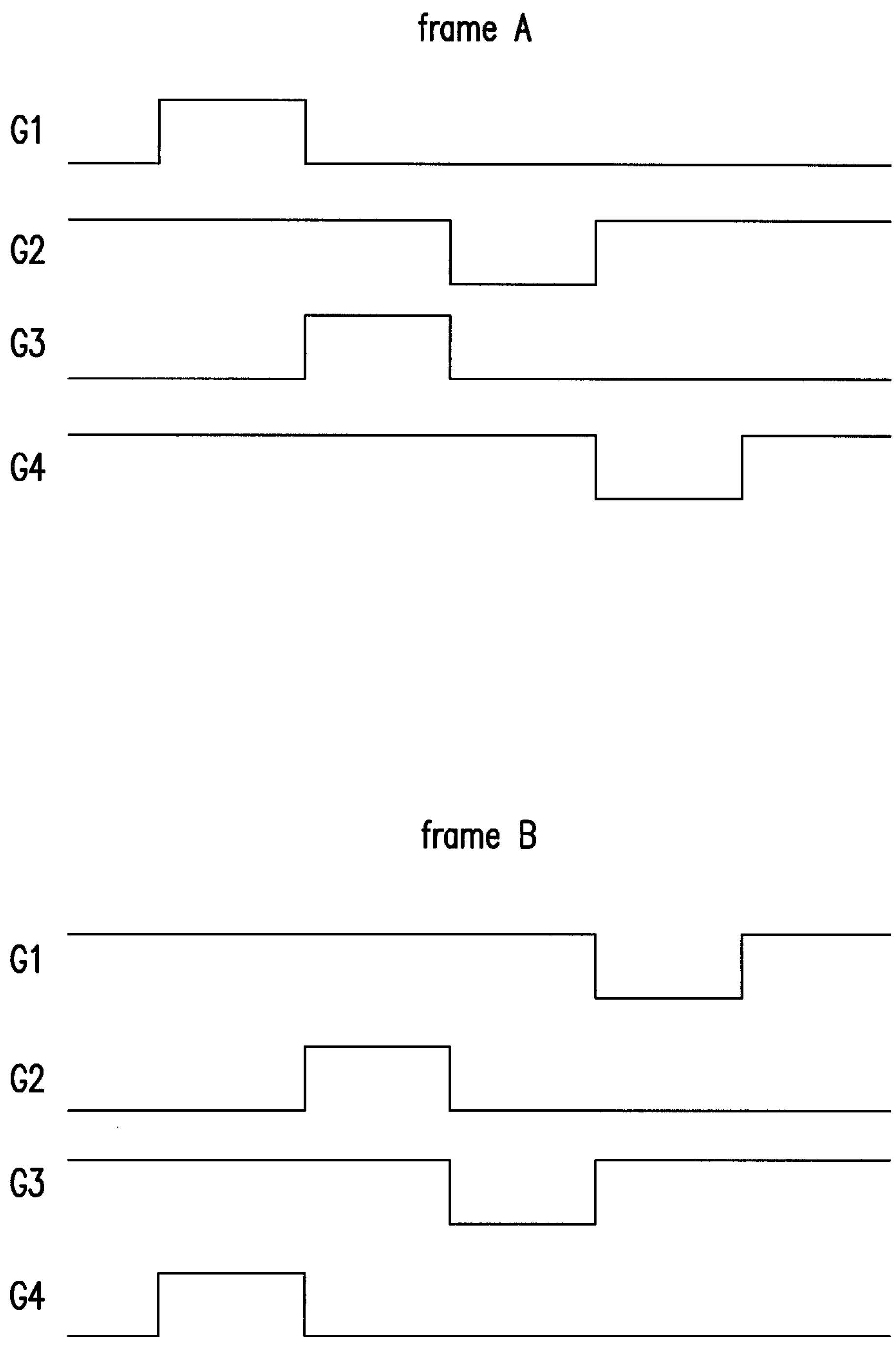
FIG. 8 is a schematic view illustrating a scan sequence mechanism of a scan method for displaying image according to an embodiment of the invention.

Table 3 is another scan sequence corresponding to the image frame B of FIG. 6, in which four consecutive scan lines G1, G2, G3, and G4 are a recurring unit with an alternative scan sequence of G3→G1→G4→G2, for example. FIG. 8 is a schematic view illustrating a scan sequence mechanism of a scan method for displaying image according to an embodiment of the invention. Referring to FIG. 8, a scan sequence of four scan lines G1, G2, G3, and G4 of the image frame B is G4→G2→G3→G1, and the voltage polarities of the pixels are represented in the illustration.

TABLE 3

| Image Frame | B | | | | | | | | | | | | | | | |
|---|---|---|---|---|---|---|---|---|---|---|---|---|---|---|---|---|
| Gate Line | 4 | 2 | 3 | 1 | 8 | 6 | 7 | 5 | 12 | 10 | 11 | 9 | 16 | 14 | 15 | 13 |
| Polarity | + | + | − | − | + | + | − | − | + | + | − | − | + | + | − | − |
| Polarity Change | y | | y | | y | | y | | y | | y | | y | | y | |

Figure 9:
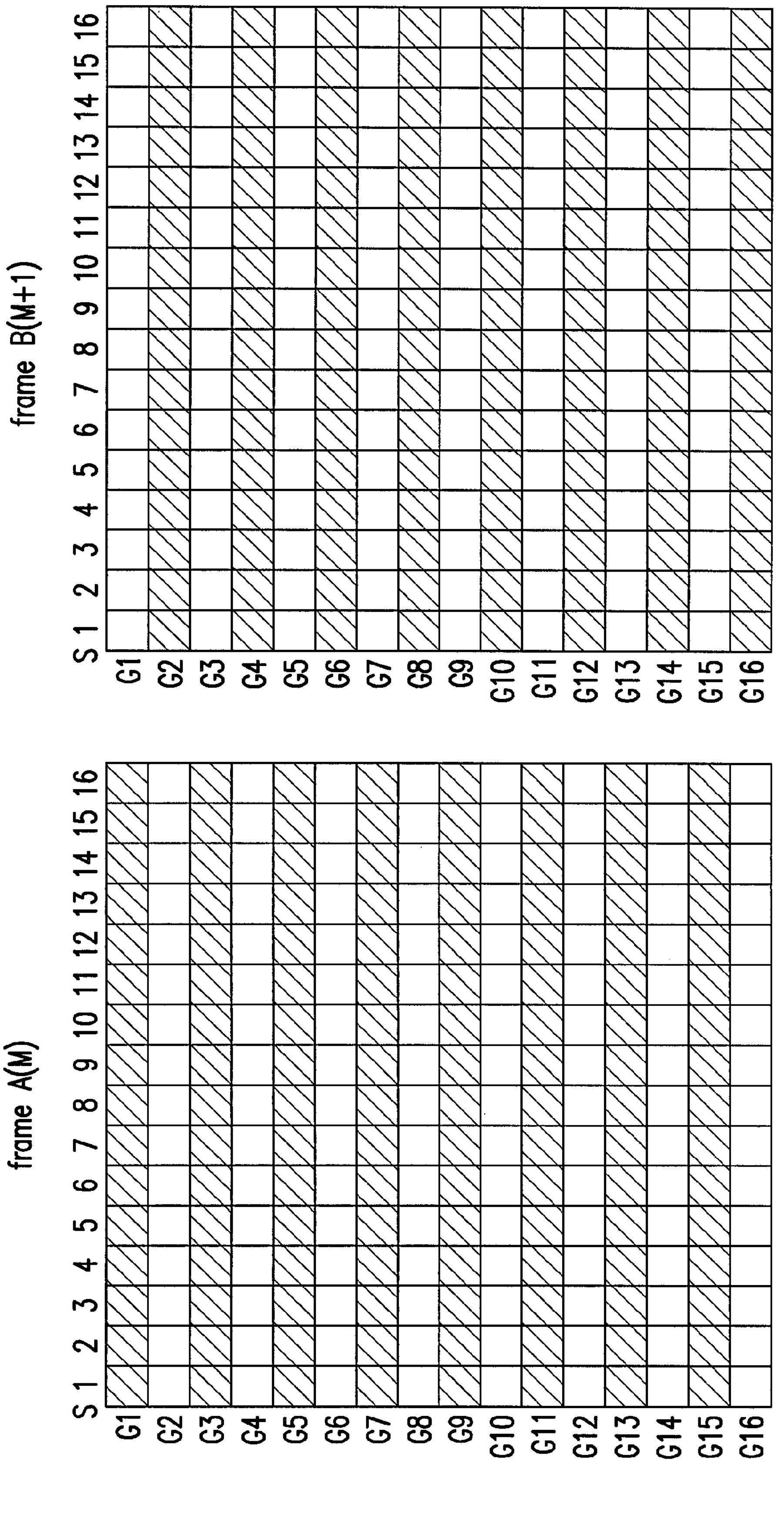
FIG. 9 is a schematic view illustrating a dark line compensation effect generated by a scan method for displaying image according to an embodiment of the invention.
Figure 10:
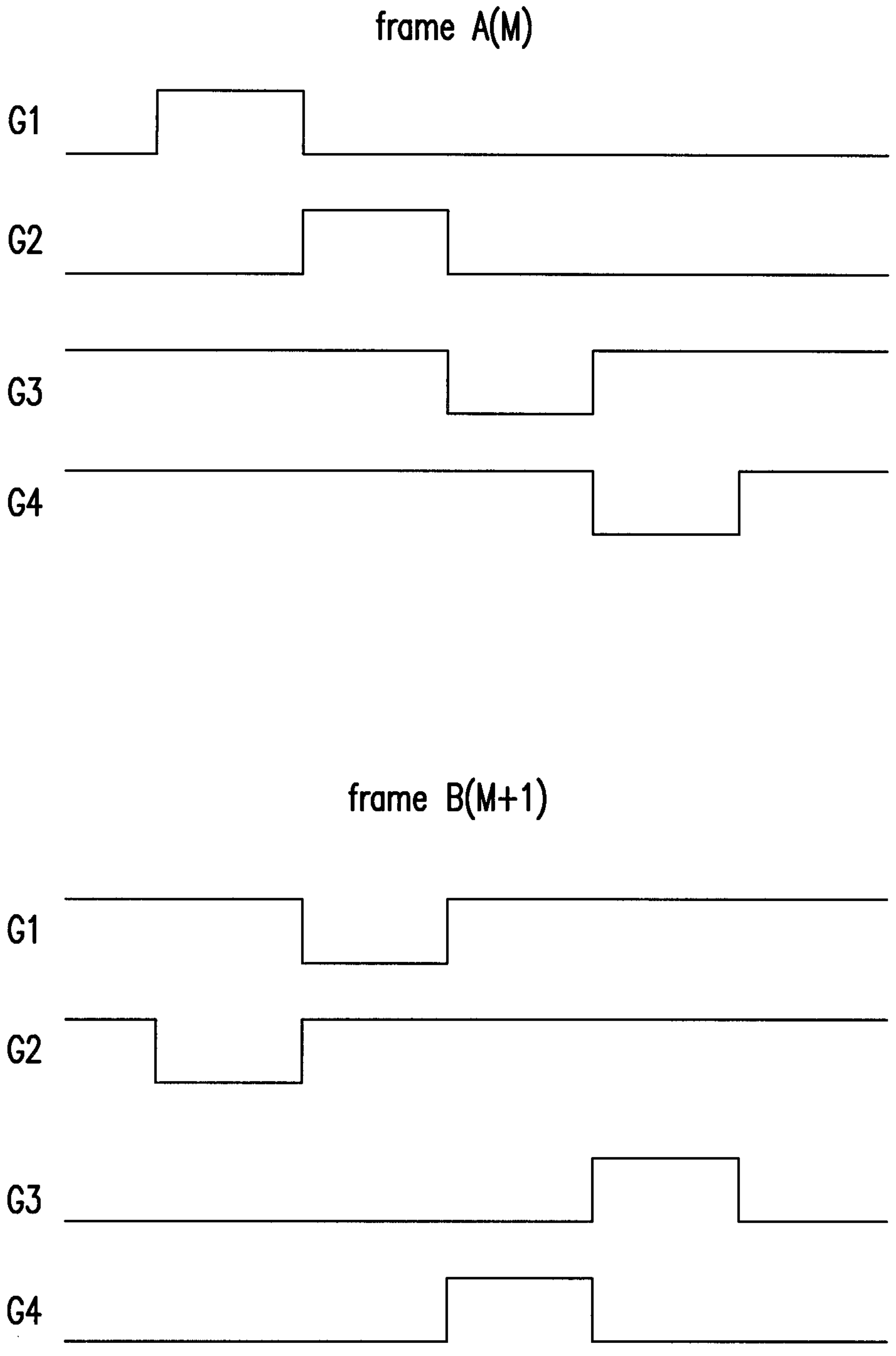
FIG. 10 is a schematic view illustrating a scan sequence mechanism of a scan method for displaying image according to an embodiment of the invention.

FIG. 9 is a schematic view illustrating a dark line compensation effect generated by a scan method for displaying image according to an embodiment of the invention. FIG. 10 is a schematic view illustrating a scan sequence mechanism of a scan method for displaying image according to an embodiment of the invention. Other scan sequences are possible for the two-dot inversion or two-line inversion display method in accordance with the compensation mechanism. For example, as shown by the image frame A in FIG. 9, the relative dark gate lines may also be a single gate line alternating with the relative bright gate lines. To achieve this compensation effect, two exemplary scan sequences are shown in FIG. 10. The scan sequence of the image frame A is G1→G2→G3→G4 . . . . The scan sequence of the image frame B is G2→G1→G4→G3 . . . .

Four image frames may be used as a compensation cycle. In other words, the effect of using four consecutive image frames to achieve the averaging effect of brightness and darkness is the combination of the effect of FIGS. 11A and 11B.

Figure 11A:
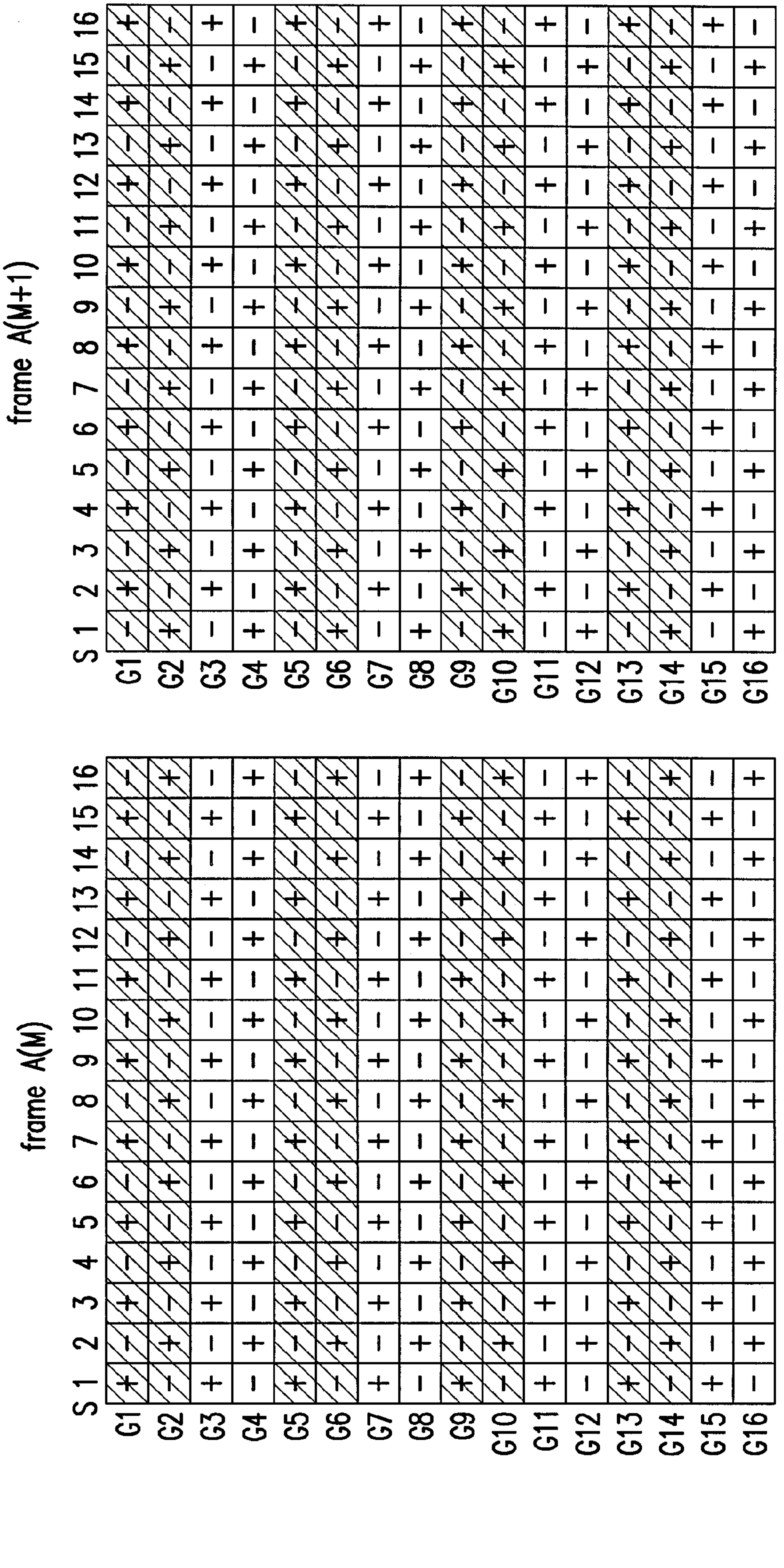
FIGS. 11A and 11B are schematic views illustrating a mechanism using a compensation cycle of four image frames according to an embodiment of the invention
Figure 11B:
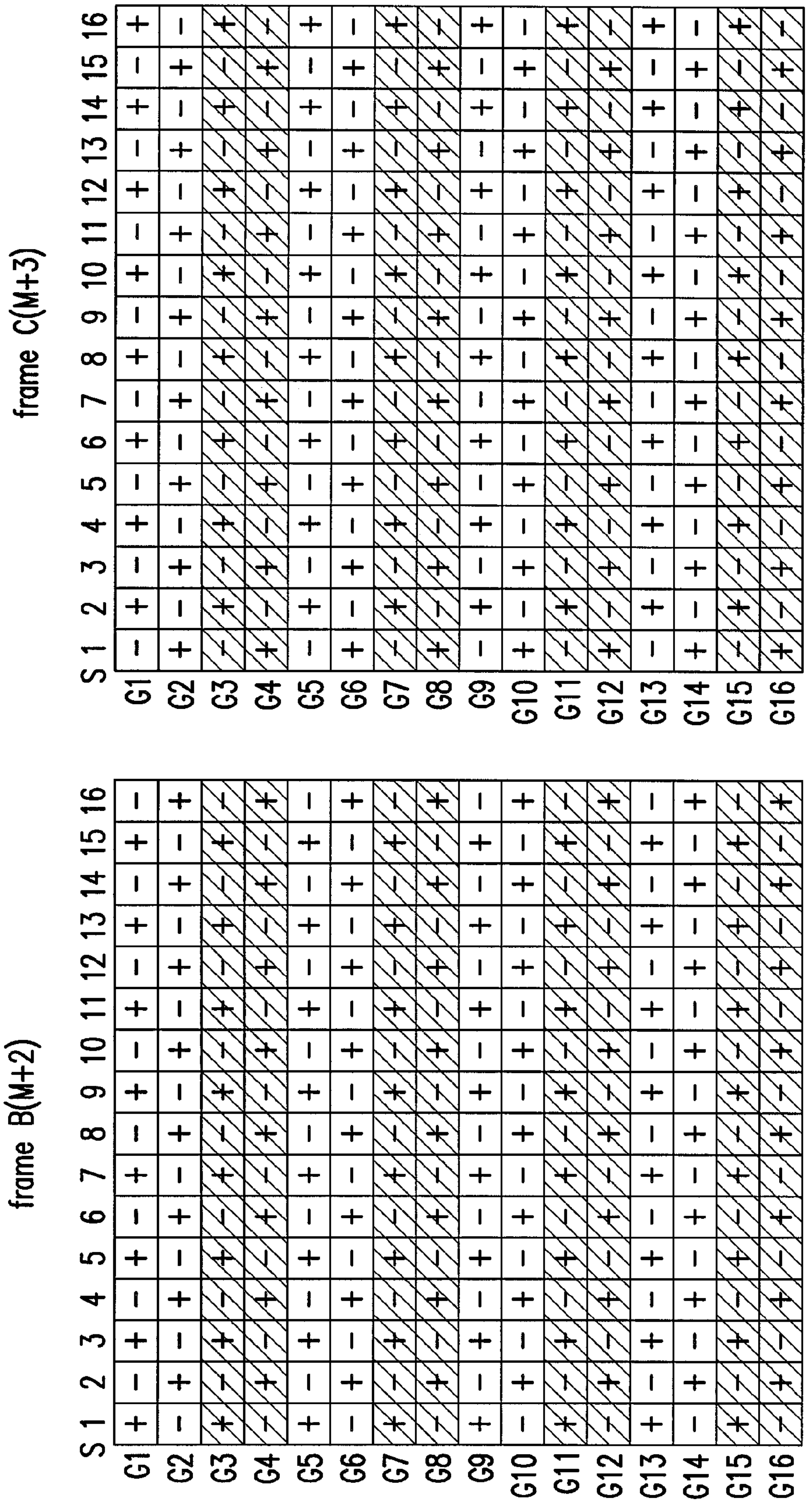
Figure 12:
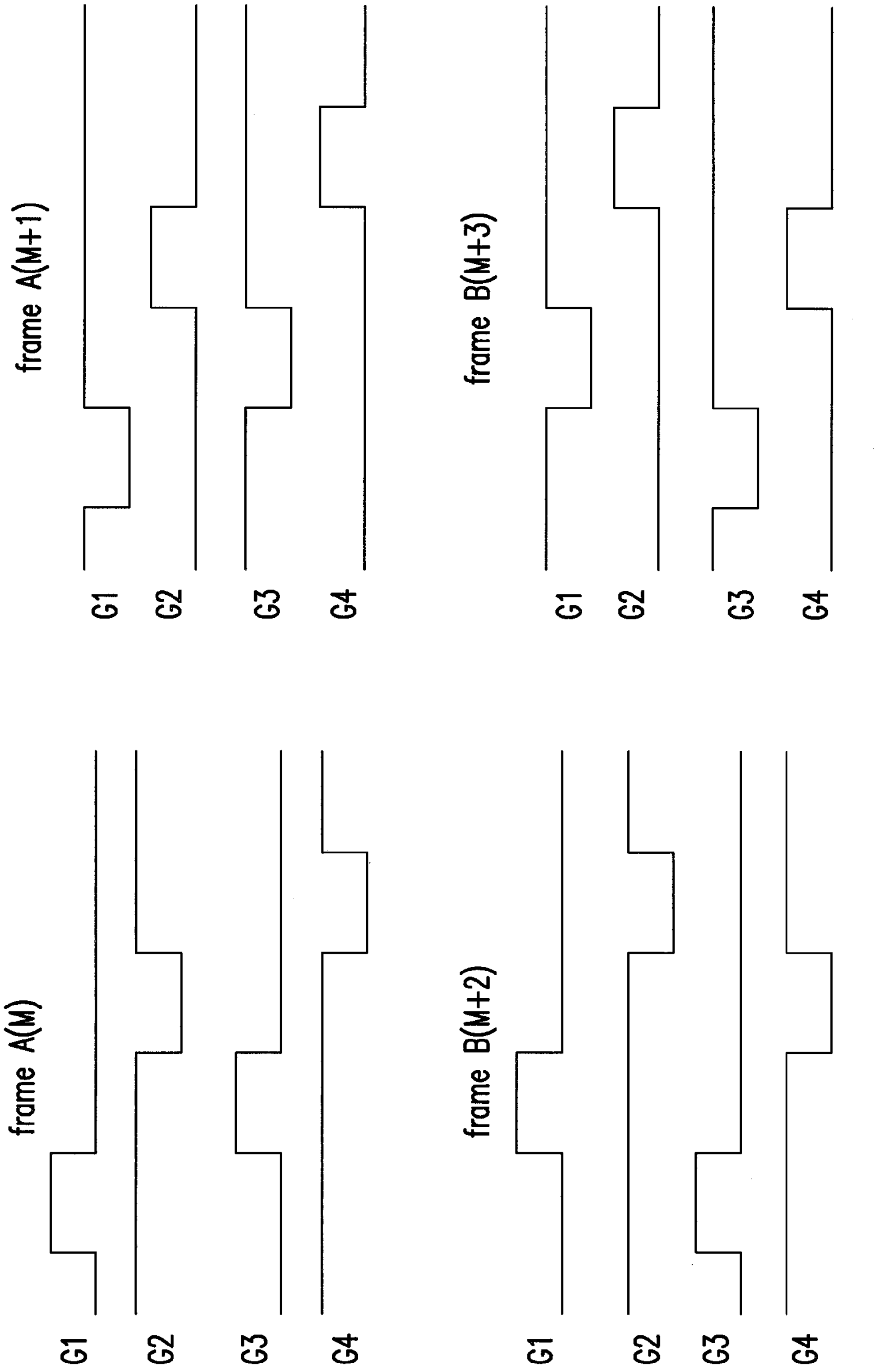
FIG. 12 is schematic view of a scan sequence of four image frames according to an embodiment of the invention.

FIGS. 11A and 11B are schematic views illustrating a mechanism using a compensation cycle of four image frames according to an embodiment of the invention. FIG. 12 is schematic view of a scan sequence of four image frames according to an embodiment of the invention. Referring to FIGS. 11A-11B and 12, for the first two image frames M and M+1, the scan sequence thereof, G1→G3→G2→G4 . . . is the same as the scan sequence of the image frame A. However, the polarity between the image frames M and M+1 is frame inverted.

For the next two image frames M+2 and M+3 of FIG. 11B, the scan sequence thereof, G3→G1→G4→G2 . . . is the same as the scan sequence of the image frame B, but the polarity between the image frames M+2 and M+3 is frame inverted.

FIG. 12 corresponds to one of the embodiments with a possible scan sequence which can generate the compensation effect of FIGS. 11A and 11B. The gate lines G1-G4 and the signals thereon depicted in FIG. 12 not only describe the scan sequence, but also the voltage polarities to input on the pixels.

The scan sequence of FIG. 12 can be represented by Tables 4-7.

TABLE 4

| Image Frame | A(M) | | | | | | | | | | | | | | | |
|---|---|---|---|---|---|---|---|---|---|---|---|---|---|---|---|---|
| Gate Line | 1 | 3 | 2 | 4 | 5 | 7 | 6 | 8 | 9 | 11 | 10 | 12 | 13 | 15 | 14 | 16 |
| Polarity | + | + | − | − | + | + | − | − | + | + | − | − | + | + | − | − |
| Polarity Change | y | | y | | y | | y | | y | | y | | y | | y | |

TABLE 5

| Image Frame | A(M + 1) | | | | | | | | | | | | | | | |
|---|---|---|---|---|---|---|---|---|---|---|---|---|---|---|---|---|
| Gate Line | 1 | 3 | 2 | 4 | 5 | 7 | 6 | 8 | 9 | 11 | 10 | 12 | 13 | 15 | 14 | 16 |
| Polarity | − | − | + | + | − | − | + | + | − | − | + | + | − | − | + | + |
| Polarity Change | y | | y | | y | | y | | y | | y | | y | | y | |

TABLE 6

| Image Frame | B(M + 2) | | | | | | | | | | | | | | | |
|---|---|---|---|---|---|---|---|---|---|---|---|---|---|---|---|---|
| Gate Line | 3 | 1 | 4 | 2 | 7 | 5 | 8 | 6 | 11 | 9 | 12 | 10 | 15 | 13 | 16 | 14 |
| Polarity | + | + | − | − | + | + | − | − | + | + | − | − | + | + | − | − |
| Polarity Change | y | | y | | y | | y | | y | | y | | y | | y | |

TABLE 7

| Image Frame | B(M + 3) | | | | | | | | | | | | | | | |
|---|---|---|---|---|---|---|---|---|---|---|---|---|---|---|---|---|
| Gate Line | 3 | 1 | 4 | 2 | 7 | 5 | 8 | 6 | 11 | 9 | 12 | 10 | 15 | 13 | 16 | 14 |
| Polarity | − | − | + | + | − | − | + | + | − | − | + | + | − | − | + | + |
| Polarity Change | y | | y | | y | | y | | y | | y | | y | | y | |

Figure 13:
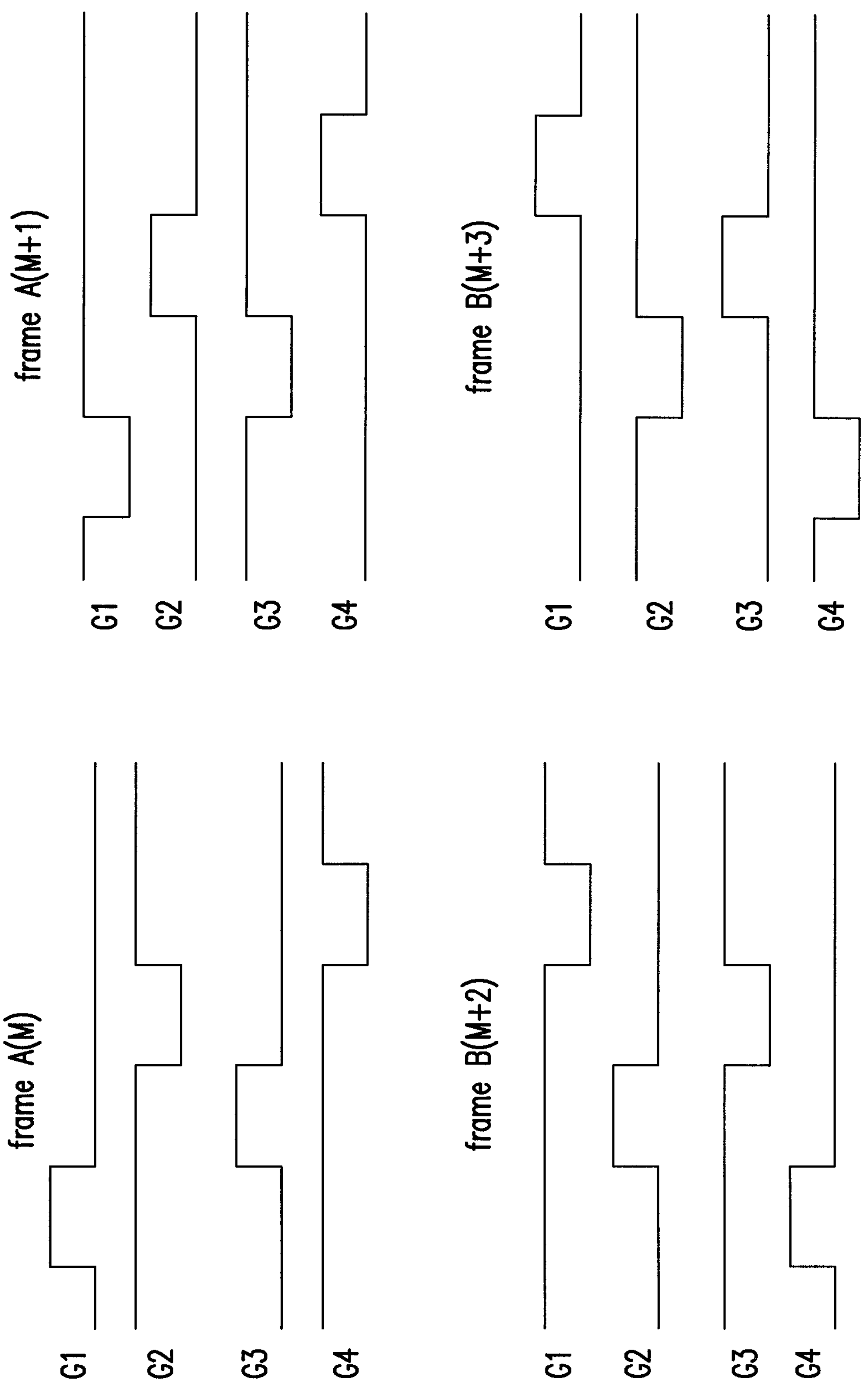
FIG. 13 is schematic view of a scan sequence of four image frames according to an embodiment of the invention.

There are still other methods of achieving the compensation effect of FIGS. 11A and 11B. For example, in another embodiment, the scan sequence of the image frame B in FIG. 12 may be changed from G3→G1→G4→G2 to G4→G2→G3→G1 . . . . FIG. 13 is schematic view of a scan sequence of four image frames according to an embodiment of the invention. The scan sequence of FIG. 13 can be represented by Tables 8-11.

TABLE 8

| Image Frame | A(M) | | | | | | | | | | | | | | | |
|---|---|---|---|---|---|---|---|---|---|---|---|---|---|---|---|---|
| Gate Line | 1 | 3 | 2 | 4 | 5 | 7 | 6 | 8 | 9 | 11 | 10 | 12 | 13 | 15 | 14 | 16 |
| Polarity | + | + | − | − | + | + | − | − | + | + | − | − | + | + | − | − |
| Polarity Change | y | | y | | y | | y | | y | | y | | y | | y | |

TABLE 9

| Image Frame | A(M + 1) | | | | | | | | | | | | | | | |
|---|---|---|---|---|---|---|---|---|---|---|---|---|---|---|---|---|
| Gate Line | 1 | 3 | 2 | 4 | 5 | 7 | 6 | 8 | 9 | 11 | 10 | 12 | 13 | 15 | 14 | 16 |
| Polarity | − | − | + | + | − | − | + | + | − | − | + | + | − | − | + | + |
| Polarity Change | y | | y | | y | | y | | y | | y | | y | | y | |

TABLE 10

| Image Frame | B(M + 2) | | | | | | | | | | | | | | | |
|---|---|---|---|---|---|---|---|---|---|---|---|---|---|---|---|---|
| Gate Line | 4 | 2 | 3 | 1 | 8 | 6 | 7 | 5 | 12 | 10 | 11 | 9 | 16 | 14 | 15 | 13 |
| Polarity | + | + | − | − | + | + | − | − | + | + | − | − | + | + | − | − |
| Polarity Change | y | | y | | y | | y | | y | | y | | y | | y | |

TABLE 11

| Image Frame | B(M + 3) | | | | | | | | | | | | | | | |
|---|---|---|---|---|---|---|---|---|---|---|---|---|---|---|---|---|
| Gate Line | 4 | 2 | 3 | 1 | 8 | 6 | 7 | 5 | 12 | 10 | 11 | 9 | 16 | 14 | 15 | 13 |
| Polarity | − | − | + | + | − | − | + | + | − | − | + | + | − | − | + | + |
| Polarity Change | y | | y | | y | | y | | y | | y | | y | | y | |

According to the same principles described above, when four image frames are used as a recurring unit for example, the four image frames may also alter the sequence thereof. For instance, the aforementioned image frames A(M+1) and B(M+2) may be interchanged as image frames B(M+1) and A(M+2).

Embodiments of the invention adopt an even number of consecutive image frames to achieve the bright and dark line compensation, or in other words, an averaging effect with regards to time. Each of the image frames has a corresponding scan sequence to generate the bright and dark line patterns needed for compensation.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A scan method for displaying image, wherein a display panel has N gate lines to display an image, N≥4, and the image is displayed by dot inversion or line inversion, the scan method comprising:

displaying a first image frame by a first scan sequence, wherein the first image frame has a plurality of first gate-line groups in relative darkness and a plurality of second gate-line groups in relative brightness, and the first gate-line groups and the second gate-line groups are alternately displayed;

just after the first image frame, displaying a second image frame by a second scan sequence, wherein the second image frame has a plurality of first gate-line groups in relative darkness and a plurality of second gate-line groups in relative brightness, and the first gate-line groups and the second gate-line groups are alternately displayed, wherein the first and second gate-line groups of the first image frame are complementary to the first and second gate-line groups of the second image frame; and cycling the first scan sequence and the second scan sequence, wherein the first gate-line groups of the first image frame and the second image frame are relatively dark due to a plurality of pixels therein with insufficient charge.

2. The scan method for displaying image as claimed in claim 1, wherein the order numbers of four consecutive gate lines are defined by 1, 2, 3, and 4, and a turn-on sequence of one of the first scan sequence and the second scan sequence is respectively 1, 3, 2, 4, and 3, 1, 4, 2; or 3, 1, 4, 2, and 1, 3, 2, 4.

3. The scan method for displaying image as claimed in claim 1, wherein the order numbers of four consecutive gate lines are defined by 1, 2, 3, and 4, and a turn-on sequence of one of the first scan sequence and the second scan sequence is respectively 1, 3, 2, 4, and 4, 2, 3, 1; or 4, 2, 3, 1, and 1, 3, 2, 4.

4. The scan method for displaying image as claimed in claim 1, wherein the order numbers of four consecutive gate lines are defined by 1, 2, 3, and 4, the image is in a two-line inversion or a two-dot display mode, and a turn-on sequence of one of the first scan sequence and the second scan sequence is respectively 1, 2, 3, 4, and 2, 1, 4, 3; or 2, 1, 4, 3, and 1, 2, 3, 4.

5. The scan method for displaying image as claimed in claim 1, wherein the order numbers of four consecutive gate lines are defined by 1, 2, 3, and 4, the image is in the two-line inversion or the two-dot display mode, and a turn-on sequence of one of the first scan sequence and the second scan sequence is respectively 1, 2, 3, 4, and 4, 3, 2, 1; or 4, 3, 2, 1, and 1, 2, 3, 4.

6. A scan method for displaying image, wherein a display panel has N gate lines to display an image, N≥4, and the image is displayed by dot inversion or line inversion, the scan method comprising:

displaying a first image frame group by a first scan sequence, the first image frame group having a plurality of first image frames, each of the first image frames having a plurality of first gate-line groups in relative darkness and a plurality of second gate-line groups in relative brightness, and the first gate-line groups and the second gate-line groups are alternately displayed;

just after the first image frame group, displaying a second image frame group by a second scan sequence, the second image frame group having a plurality of second image frames, each of the second image frames having a plurality of third gate-line groups in relative darkness and a plurality of fourth gate-line groups in relative brightness, and the third gate-line groups and the fourth gate-line groups are alternately displayed, wherein the first and second gate-line groups of the first image frames are complementary to the third and fourth gate-line groups of the second image frames, wherein a quantity of the second image frames of the second image frame group is equal to a quantity of the first image frames of the first image frame group; and cycling the first scan sequence and the second scan sequence, wherein the first gate-line groups and the third gate-line groups of the first image frames and the second image frames are relatively dark due to a plurality of pixels therein with insufficient charge.

7. The scan method for displaying image as claimed in claim 6, wherein a pixel polarity between two image frames of the plurality of first image frames is the same, and a pixel polarity between two image frames of the plurality of second image frames is the same.

8. The scan method for displaying image as claimed in claim 7, wherein the order numbers of four consecutive gate lines are defined by 1, 2, 3, and 4, and a turn-on sequence of one of the first scan sequence and the second scan sequence is respectively 1, 3, 2, 4, and 3, 1, 4, 2; or 3, 1, 4, 2, and 1, 3, 2, 4.

9. The scan method for displaying image as claimed in claim 7, wherein the order numbers of four consecutive gate lines are defined by 1, 2, 3, and 4, and a turn-on sequence of one of the first scan sequence and the second scan sequence is respectively 1, 3, 2, 4, and 4, 2, 3, 1; or 4, 2, 3, 1, and 1, 3, 2, 4.

10. The scan method for displaying image as claimed in claim 7, wherein the order numbers of four consecutive gate lines are defined by 1, 2, 3, and 4, the image is in a two-line inversion or a two-dot display mode, and a turn-on sequence of one of the first scan sequence and the second scan sequence is respectively 1, 2, 3, 4, and 2, 1, 4, 3; or 2, 1, 4, 3, and 1, 2, 3, 4.

11. The scan method for displaying image as claimed in claim 7, wherein the order numbers of four consecutive gate lines are defined by 1, 2, 3, and 4, the image is in the two-line inversion or the two-dot display mode, and a turn-on sequence of one of the first scan sequence and the second scan sequence is respectively 1, 2, 3, 4, and 4, 3, 2, 1; or 4, 3, 2, 1, and 1, 2, 3, 4.

12. The scan method for displaying image as claimed in claim 6, wherein the pixel polarity between two image frames of the plurality of first image frames is inverted, and the pixel polarity between two image frames of the plurality of second image frames is inverted.

13. The scan method for displaying image as claimed in claim 12, wherein the order numbers of four consecutive gate lines are defined by 1, 2, 3, and 4, and a turn-on sequence of one of the first scan sequence and the second scan sequence is respectively 1, 3, 2, 4, and 3, 1, 4, 2; or 3, 1, 4, 2, and 1, 3, 2, 4.

14. The scan method for displaying image as claimed in claim 12, wherein the order numbers of four consecutive gate lines are defined by 1, 2, 3, and 4, and a turn-on sequence of one of the first scan sequence and the second scan sequence is respectively 1, 3, 2, 4, and 4, 2, 3, 1; or 4, 2, 3, 1, and 1, 3, 2, 4.

15. The scan method for displaying image as claimed in claim 12, wherein the order numbers of four consecutive gate lines are defined by 1, 2, 3, and 4, the image is in a two-line inversion or a two-dot display mode, and a turn-on sequence of one of the first scan sequence and the second scan sequence is respectively 1, 2, 3, 4, and 2, 1, 4, 3; or 2, 1, 4, 3, and 1, 2, 3, 4.

16. The scan method for displaying image as claimed in claim 12, wherein the order numbers of four consecutive gate lines are defined by 1, 2, 3, and 4, the image is in the two-line inversion or the two-dot display mode, and a turn-on sequence of one of the first scan sequence and the second scan sequence is respectively 1, 2, 3, 4, and 4, 3, 2, 1; or 4, 3, 2, 1, and 1, 2, 3, 4.

17. The scan method for displaying image as claimed in claim 6, wherein the quantity of the second image frames of the second image frame group and the quantity of the first image frames of the first image frame group are both equal to 2, so as to enable image display by cycling four image frames.

* * * * *